United States Patent
Matsumoto et al.

(10) Patent No.: US 10,325,161 B2
(45) Date of Patent: Jun. 18, 2019

(54) VEHICLE STATE DETERMINING DEVICE, DISPLAY PROCESSING DEVICE, AND VEHICLE STATE DETERMINING METHOD

(71) Applicant: FUJITSU TEN LIMITED, Kobe-shi, Hyogo (JP)

(72) Inventors: Yuuki Matsumoto, Kobe (JP); Atsushi Mino, Kobe (JP); Naoshi Kakita, Kobe (JP)

(73) Assignee: FUJITSU TEN Limited, Kobe (JP)

( * ) Notice: Subject to any disclaimer, the term of this patent is extended or adjusted under 35 U.S.C. 154(b) by 165 days.

(21) Appl. No.: 15/258,536

(22) Filed: Sep. 7, 2016

(65) Prior Publication Data

US 2017/0116486 A1 Apr. 27, 2017

(30) Foreign Application Priority Data

Oct. 26, 2015 (JP) ................................ 2015-209907

(51) Int. Cl.
*G06K 9/00* (2006.01)
*G06K 9/46* (2006.01)
*G06T 7/246* (2017.01)

(52) U.S. Cl.
CPC ..... *G06K 9/00791* (2013.01); *G06K 9/00812* (2013.01); *G06K 9/4671* (2013.01); *G06T 7/246* (2017.01); *G06T 2207/10016* (2013.01); *G06T 2207/30264* (2013.01)

(58) Field of Classification Search
CPC ........... G06K 9/00791; G06K 9/00812; G06K 9/4671; G06T 7/246; G06T 2207/30264; G06T 2207/10016
See application file for complete search history.

(56) References Cited

U.S. PATENT DOCUMENTS

| 5,161,247 A | * | 11/1992 | Murakami | H04N 5/145 375/E7.1 |
| 2004/0076324 A1 | * | 4/2004 | Burl | G05D 1/0246 382/153 |
| 2006/0095195 A1 | * | 5/2006 | Nishimura | B60W 30/025 701/96 |

(Continued)

FOREIGN PATENT DOCUMENTS

| CN | 102208011 A | 10/2011 |
| CN | 204405692 U | 6/2015 |
| JP | 2013-003110 A | 1/2013 |

OTHER PUBLICATIONS

Javier (Lane-Change Decision Aid System Based on Motion-Driven Vehicle Tracking, Published in IEEE Transactions on Vehicular Technology, vol. 57, No. 5, Sep. 2008).*

*Primary Examiner* — Christopher S Kelley
*Assistant Examiner* — Nasim N Nirjhar
(74) *Attorney, Agent, or Firm* — Oliff PLC

(57) ABSTRACT

There is provided a vehicle state determining device. An extracting unit is configured to extract feature points from images acquired by an imaging device mounted on a vehicle. An estimating unit is configured to estimate the movement amount of the vehicle at each time set at intervals of a predetermined time, on the basis of the feature points extracted by the extracting unit. A determining unit is configured to perform determination on movement of the vehicle on the basis of the movement amount estimated by the estimating unit, and the change amount of the movement amount.

7 Claims, 12 Drawing Sheets

(56) References Cited

U.S. PATENT DOCUMENTS

2007/0253632 A1* 11/2007 Ting .................... H04N 5/3598
                                                                382/254
2008/0174452 A1* 7/2008 Yamamoto ......... B62D 15/0275
                                                                340/932.2

* cited by examiner

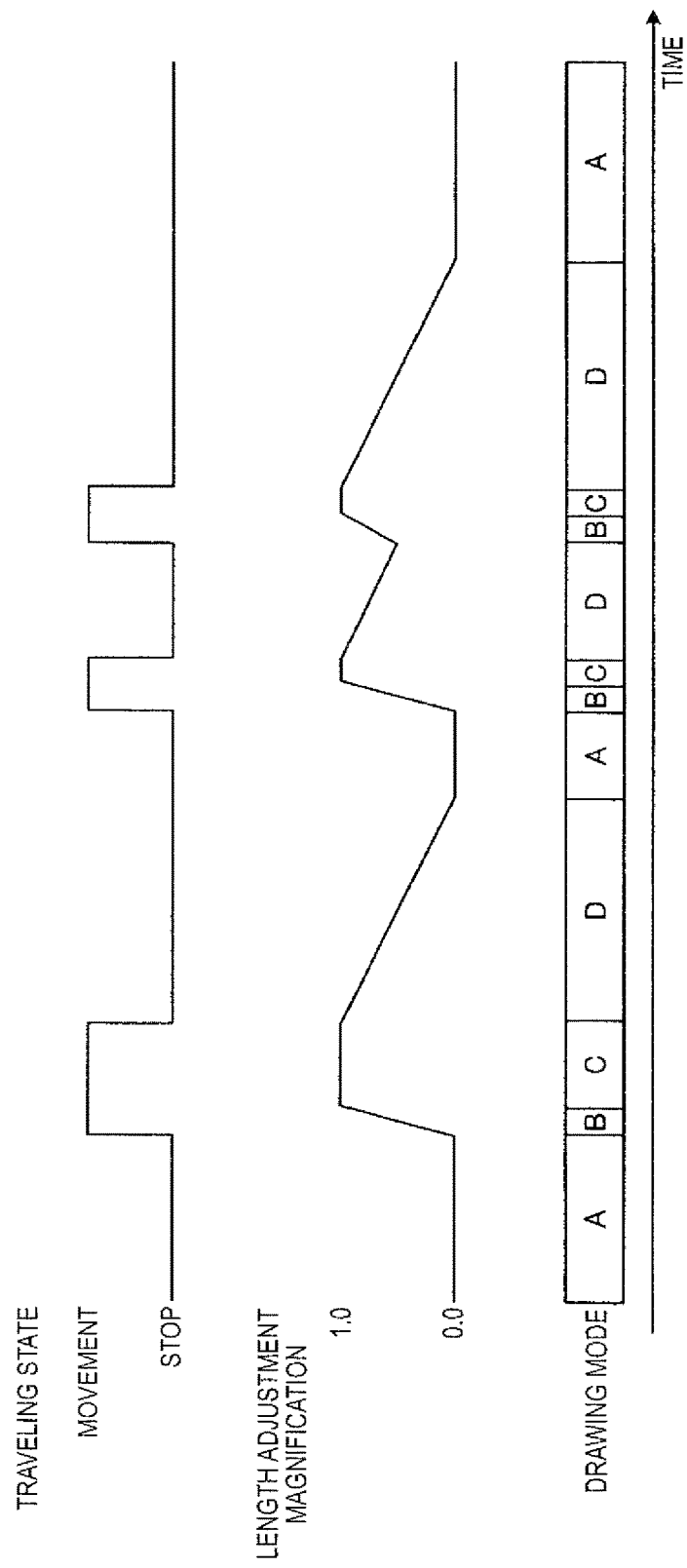

VEHICLE STATE DETERMINING DEVICE, DISPLAY PROCESSING DEVICE, AND VEHICLE STATE DETERMINING METHOD

TECHNICAL FIELD

The present invention relates to a vehicle state determining device, a display processing device, and a vehicle state determining method.

RELATED ART

In the related art, there are known devices for detecting the states of vehicles having imaging devices on the basis of images acquired by the imaging devices (see Patent Document 1, for instance). For example, such a device selects an optical flow on the basis of acquired images, and detects the movement state of a vehicle on the basis of the selected optical flow.

Patent Document 1: Japanese Patent Application Publication No. 2013-3110A

However, since the device of the related art detects the state of the vehicle on the basis of an optical flow selected on the basis of acquired images, there is a fear that if the circumstances surrounding the vehicle change like a case where the hazard lamps of the vehicle flash, the accuracy of detection of the movement state of the vehicle may decrease.

SUMMARY

It is therefore an object of the present invention to provide a vehicle state determining device, a display processing device, and a vehicle state determining method capable of determining the movement state of a vehicle with a high degree of accuracy.

According to an aspect of the embodiments of the present invention, there is provided a vehicle state determining device of the present invention includes an extracting unit, an estimating unit, and a determining unit. The extracting unit extracts feature points from images acquired by an imaging device mounted on a vehicle. On the basis of the feature points extracted by the extracting unit, the estimating unit estimates the movement amount of the vehicle at each time set at intervals of a predetermined time. On the basis of the movement amount estimated by the estimating unit, and the change amount of the movement amount, the determining unit performs determination on movement of the vehicle.

According to the present invention, it is possible to provide a vehicle state determining device, a display processing device, and a vehicle state determining method capable of determining the movement state of a vehicle with a high degree of accuracy.

BRIEF DESCRIPTION OF THE DRAWINGS

Exemplary embodiments of the present invention will be described in detailed based on the following figures, wherein:

FIG. 9 is a timing chart illustrating the corresponding relation of traveling states, drawing modes, and length adjustment magnifications according to the embodiment;

DETAILED DESCRIPTION

Hereinafter, with reference to the accompanying drawings, a vehicle state determining device, a display processing device, and a vehicle state determining method according to an embodiment of the present invention will be described in detail. However, the present invention is not limited by the following embodiment.

[1. Vehicle State Determining Method]

FIG. 1 is an explanatory view illustrating a vehicle state determining method according to an embodiment of the present invention. The vehicle state determining method is performed, for example, by a vehicle state determining device which is mounted on a vehicle C. The vehicle state determining device is installed, for example, inside the vehicle C (not shown). Hereinafter, a method of determining the state of the vehicle C will be described taking, as an example, a case of parking the vehicle C in an empty space.

The vehicle C has an imaging device such as a camera, and the imaging device images the vicinity of the vehicle C (for example, the rear side of the vehicle C) at intervals of a predetermined time T, thereby generating images. The vehicle state determining device acquires the images from the imaging device.

The vehicle state determining device extracts feature points from the images. On the basis of the extracted feature points, the vehicle state determining device estimates the movement amounts D of the vehicle C at each time set at intervals of the predetermined time T. Such a movement amount D will also be referred to as the velocity of the vehicle C. For example, the vehicle state determining device can use the average of the movement amounts D of a plurality of feature points, as the movement amount D of the vehicle C.

Figure 1A:
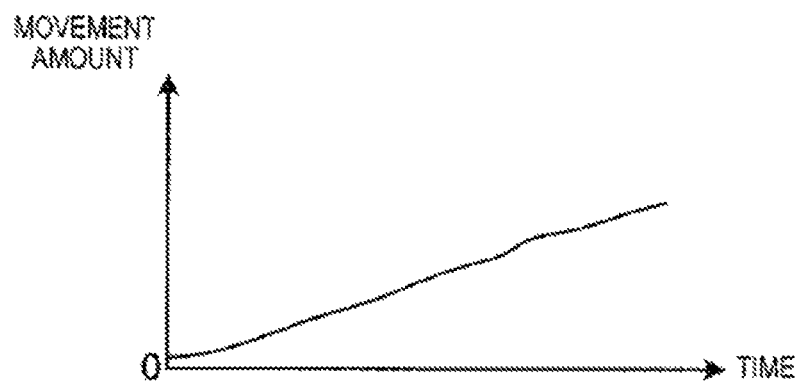
FIGS. 1A to 1C are explanatory views illustrating a vehicle state determining method according to an embodiment.

For example, in a case where the vehicle C starts to move from a stop state, and gradually accelerates, the movement amount D of the vehicle C which is estimated at intervals of the predetermined time T increases gently from a state where the movement amount is almost zero, as shown in FIG. 1A. FIG. 1A is a graph illustrating variation of the movement amount D with time. In this graph, the vertical axis represents the movement amount, and the horizontal axis represents time.

The circumstances surrounding the vehicle C may change, for example, a moving object other than the vehicle C may be included in acquired images. In some changed circumstances, the movement amount D may not be correctly detected. In this case, for example, even though the vehicle C is in a stop state, it may be determined that the vehicle C is moving. For this reason, in the vehicle state determining method according to the present embodiment, the movement state is determined on the basis of not only the movement amount D but also the amount A of change in the movement amount D.

Figure 1B:
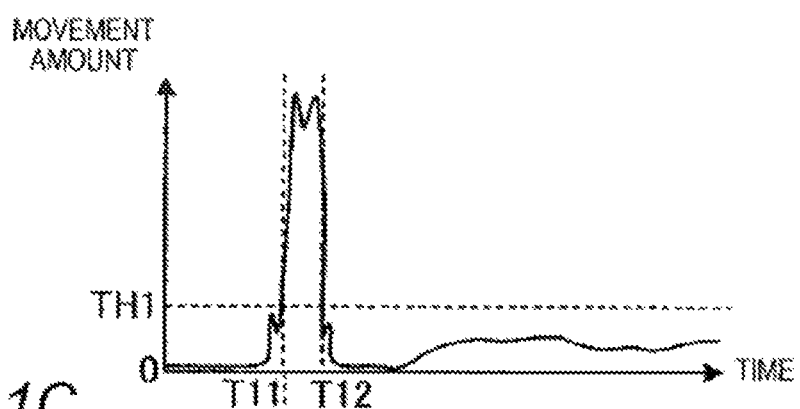

A case where acquired images include another vehicle C1 as an example of a moving object other than the vehicle C will be described. FIG. 1B is a graph illustrating variation of the movement amount D with time in the above described case. In the graph shown in FIG. 1B, the vertical axis representing the movement amount, and the horizontal axis represents time.

In this case, the vehicle state determining device detects movement of another vehicle C1 as movement of the vehicle C. For this reason, in a period when another vehicle C1 moves (the period from a time T11 to a time T12 in FIG. 1B), the graph of the movement amount D of the vehicle C which is estimated at intervals of the predetermined time T becomes a graph representing values according to the movement amount of another vehicle C1. If the vehicle state determining device performs determination on movement of the vehicle C, for example, only by comparing the movement amount D with a first threshold TH1, in the period from the time T11 to the time T12 shown in FIG. 1B, even though the vehicle C is in a stop state, the vehicle state determining device erroneously determines that the vehicle C is moving.

For this reason, the vehicle state determining device according to the present embodiment determines a movement state on the basis of not only the movement amount D but also the change amount A of the movement amount D. For example, if a state where the movement amount D is equal to or greater than the first threshold TH1 and the change amount A is less than a second threshold TH2 appears, the vehicle state determining device performs determination on movement of the vehicle C on the basis of the appearance state. Here, the change amount A is the change amount A of the movement amount D at each time set at intervals of the predetermined time T, and is, for example, the absolute value of the difference between a movement amount D1 at a predetermined timing T1 and a movement amount D0 at a timing T0 immediately before the predetermined timing T1. Therefore, it can be said that the vehicle state determining device determines a movement state on the basis of the absolute value of acceleration which is the change amount A of the velocity of the vehicle C.

Figure 1C:
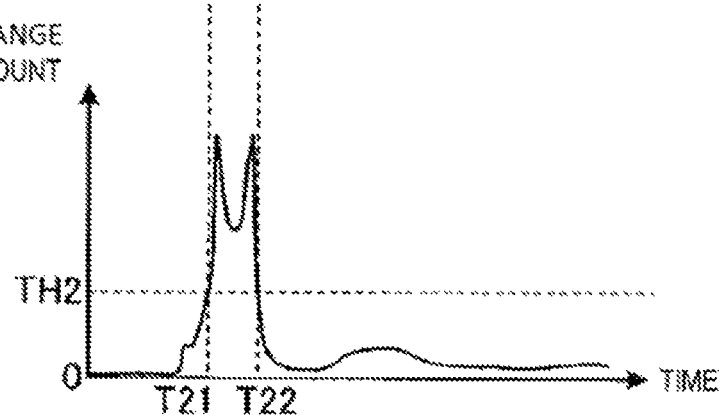

FIG. 1C is a graph illustrating variation of the change amount A with time. In the graph shown in FIG. 1C, the vertical axis represents the change amount, and the horizontal axis represents time. As shown in FIG. 1C, as the movement amount D increases or decreases, the change amount A of the movement amount D also increases or decreases. In a case where the movement amount D changes according to a moving object other than the vehicle C, like a case where another vehicle C1 moves, the change amount A of the movement amount D increases.

For this reason, even though the movement amount D of the vehicle C is equal to or greater than the first threshold TH1 as shown in the period between the time T11 and the time T12 in FIG. 1B, if the change amount A of the movement amount D is equal to or greater than the second threshold TH2 as shown in FIG. 1C, the vehicle state determining device determines that there is a possibility that the movement amount D is changing according to a moving object other than the vehicle C. In the present embodiment, in this case, the vehicle state determining device determines that the vehicle C is in a stop state.

As described above, the vehicle state determining device performs determination on movement of the vehicle C on the basis of the movement amount D and the change amount A of the movement amount D. Therefore, even though the circumstances surrounding the vehicle C1 change, for example, even though another vehicle C1 other than the vehicle C moves, it is possible to determine whether the vehicle C is moving that is, the movement state of the vehicle C, with a high degree of accuracy.

Although the case where another moving object such as the vehicle C1 is included in the imaging range of the imaging device has been described, the present invention is not limited thereto. For example, even in other cases such as a case where hazard lamps are flashing, it is possible to improve the accuracy of determination on the state of the vehicle C.

In the case where the hazard lamps are flashing, for example, at night, feature points which are extracted from an image which is acquired when the lamps are on may be different from feature points which are extracted from an image which is acquired when the lamps are off. In this case, if the movement amount D is estimated on the basis of those feature points, the movement amount D significantly changes according to whether the lamps are on or off. Even in this case, since the vehicle state determining device performs determination on movement of the vehicle C on the basis of the movement amount D and the change amount A of the movement amount D, it is difficult for change of the movement amount D to be influenced by flashing of the lamps, and it is possible to determine the state of the vehicle C with a high degree of accuracy.

Here, a stop state means a state where the vehicle C is moving at a velocity lower than a predetermined velocity, or a state where the vehicle C has completely stopped and the velocity of the vehicle is zero. Also, a movement state means a state where the vehicle C is moving at a velocity equal to or higher than the predetermined velocity. Hereinafter, a display processing device 1 including the vehicle state determining device described above, and a driving assistance system S will be further described.

[2. Driving Assistance System S]

Figure 2:
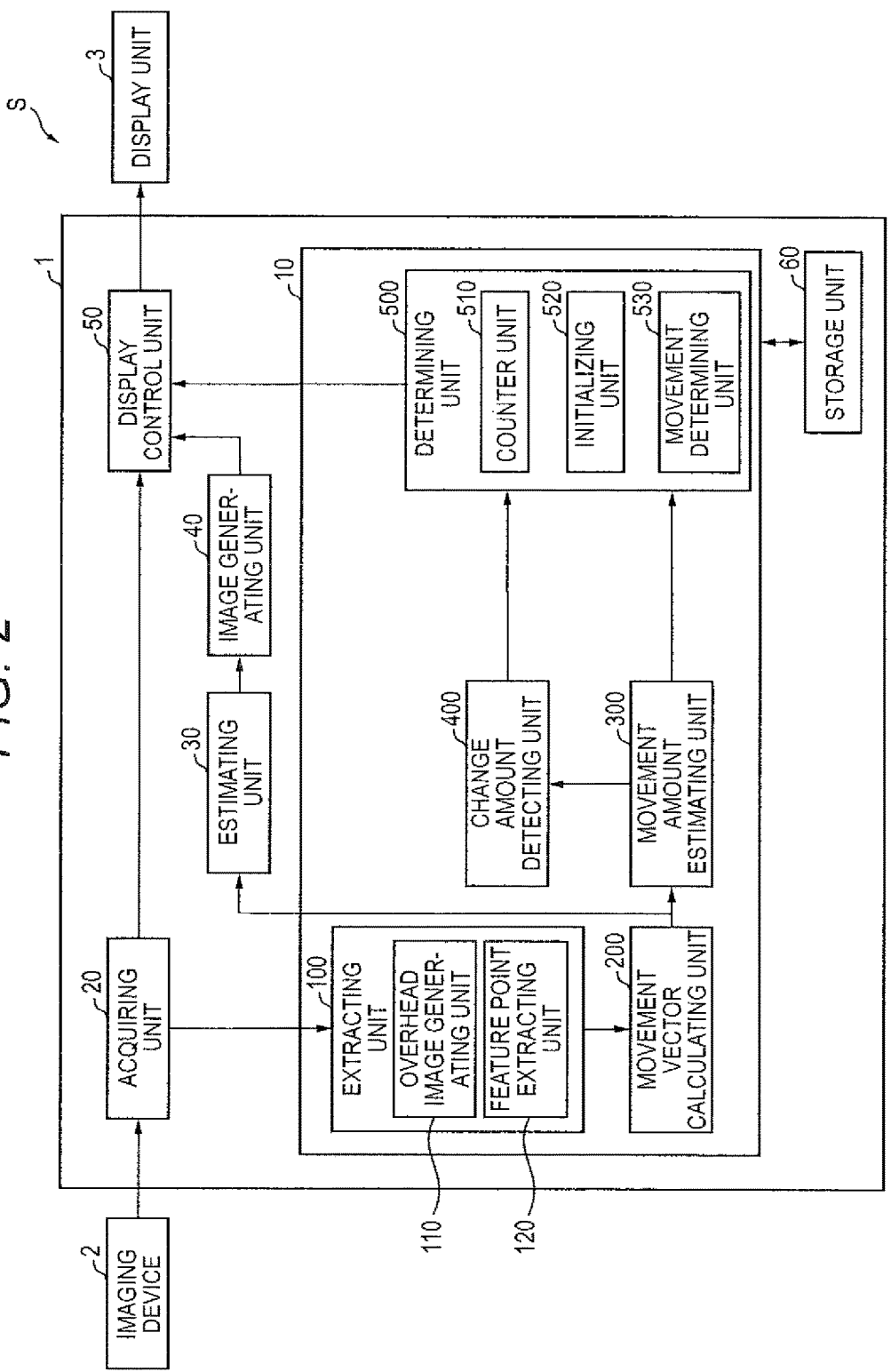
FIG. 2 is a view illustrating a configuration example of a driving assistance system according to the embodiment.

FIG. 2 is a view illustrating a configuration example of the driving assistance system S according to the embodiment of the present invention. As shown in FIG. 2, the driving assistance system S includes the display processing device 1, an imaging device 2, and a display device 3.

[2.1. Imaging Device 2]

Figure 3:
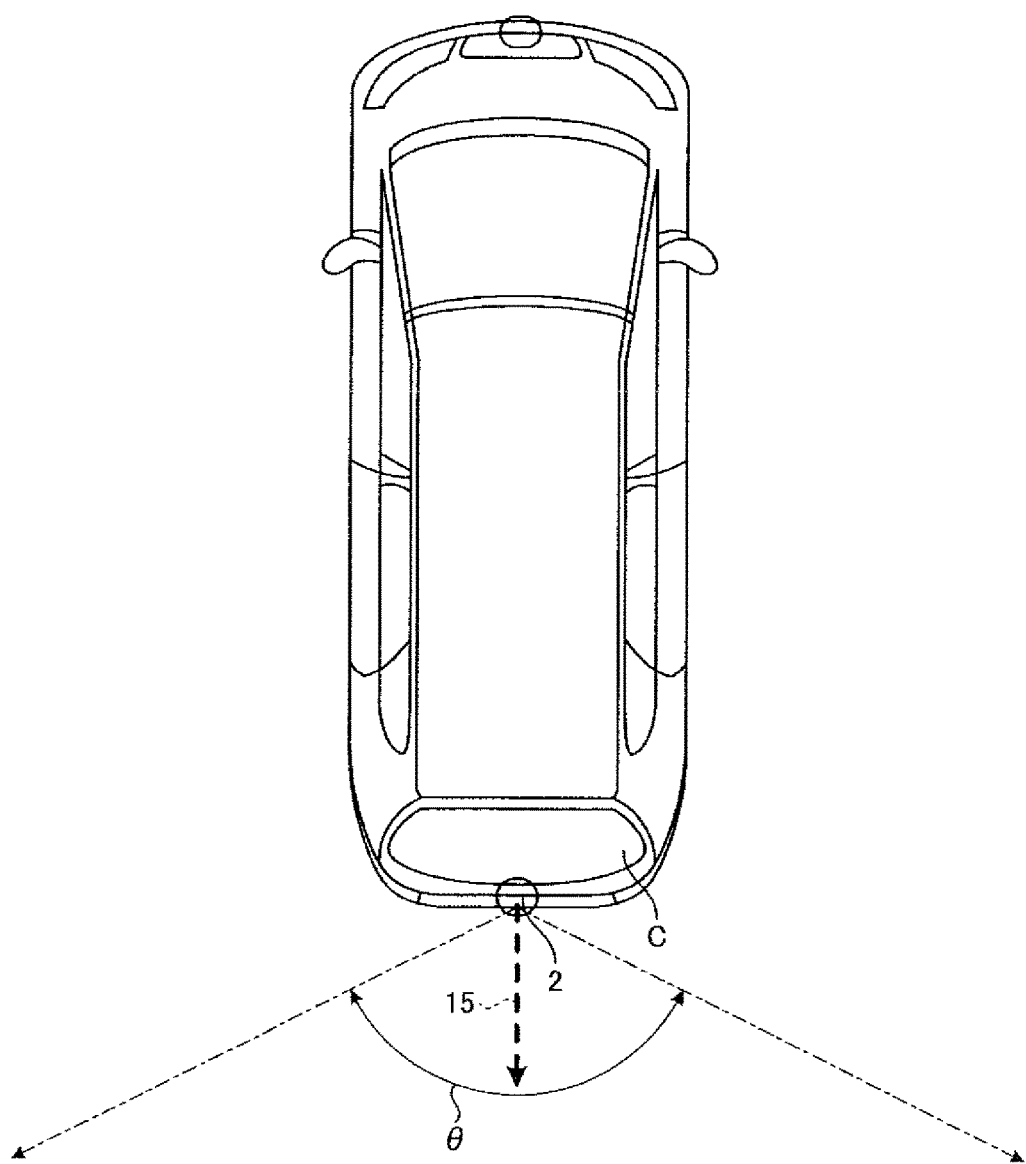
FIG. 3 is a view illustrating an arrangement example of an imaging device according to the embodiment.

The imaging device 2 is, for example, a so-called back camera which is disposed on the rear side of the vehicle C. As shown in FIG. 3, the imaging device 2 is installed on the back door positioned at the rear end of the vehicle C, and has a field angle θ. The imaging device 2 has an optical axis 15 which is directed to the rear side along the front-rear direction of the vehicle C. Therefore, the imaging device 2 can image a wide area of the rear side of the vehicle C with the field angle θ, for example, at intervals of the predetermined time T, thereby generating images G1 showing the state of the rear side of the vehicle C. The lens of the imaging device 2 is, for example, a fisheye lens. FIG. 3 is a view illustrating an arrangement example of the imaging device 2.

[2.2. Display Processing Device 1]

The display processing device 1 shown in FIG. 2 estimates the movement path of the vehicle C on the basis of the images G1, and displays an estimated-path image showing the estimated movement path, on the display device 3, such that the estimated-path image overlaps each image G1, thereby assisting the driver of the vehicle C in driving. The display processing device 1 includes a vehicle state determining device 10, an acquiring unit 20, an estimating unit 30, an image generating unit 40, a display control unit 50, and a storage unit 60.

[2.2.1. Acquiring Unit 20]

The acquiring unit 20 repeatedly acquires an image G1 of a frame unit generated by the imaging device 2. In a case where the image G1 is an analog image, the acquiring unit 20 converts the analog image G1 into a digital image G1 (A/D conversion). The acquiring unit 20 outputs the acquired image G1 to the vehicle state determining device 10 and the display control unit 50.

[2.2.2. Vehicle State Determining Device 10]

The vehicle state determining device 10 performs determination on movement of the vehicle C on the basis of acquired images G1. The vehicle state determining device 10 includes an extracting unit 100, a movement vector calculating unit 200, a movement amount estimating unit 300, a change amount detecting unit 400, and a determining unit 500.

[2.2.2.1. Extracting Unit 100]

The extracting unit 100 extracts a plurality of feature points from each image G1. The extracting unit 100 includes an overhead image generating unit 110 and a feature point extracting unit 120.

The overhead image generating unit 110 performs a coordinate converting process on each image G1, thereby generating an overhead image G2 which is an image as seen from a point above the vehicle C. For example, the overhead image generating unit 110 projects (maps) each image G1 onto a predetermined projection plane, and extracts an image of an area included in a predetermined view angle as seen from a point above the vehicle C, as an overhead image G2, from the image G1 projected on the predetermined projection plane.

Figure 4:
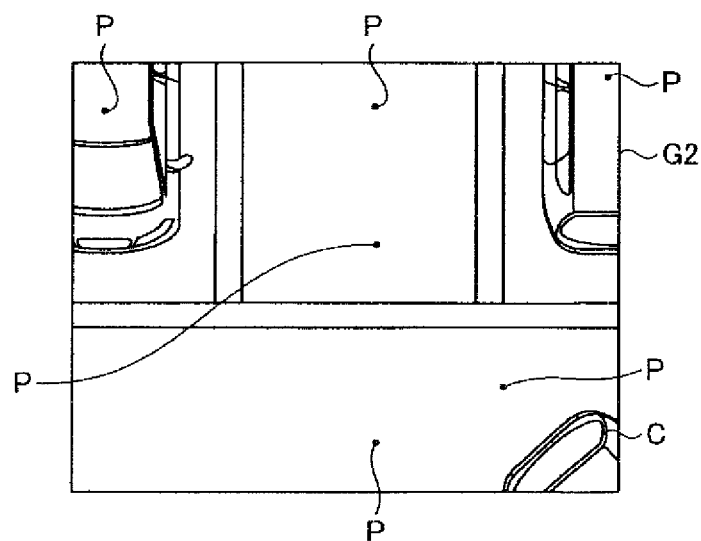
FIG. 4 is a view illustrating feature points which are extracted by a feature point extracting unit according to the embodiment.

The feature point extracting unit 120 extracts feature points from the overhead image G2 generated by the overhead image generating unit 110. Feature points mean remarkable and detectable points included in the overhead image G2. The feature point extracting unit 120 detects a plurality of edges, for example, using an edge detecting process, and extracts the intersections of the plurality of edges as feature points. As shown in FIG. 4, the feature point extracting unit 120 extracts a plurality of feature points P from the overhead image G2. FIG. 4 is a view illustrating the feature points P which are extracted by the feature point extracting unit 120.

However, the feature point extracting method is not limited thereto. The feature point extracting unit may extract feature points P on the basis of luminance information and color information included in the overhead image G2. The feature point extracting unit 120 outputs the extracted feature points to the movement vector calculating unit 200.

[2.2.2.2. Movement Vector Calculating Unit 200]

The movement vector calculating unit 200 calculates a movement vector V on the basis of the feature points extracted by the feature point extracting unit 120 of the extracting unit 100. Specifically, the movement vector calculating unit 200 associates feature points extracted from overhead images G2 acquired at different times, with each other.

Figure 5:
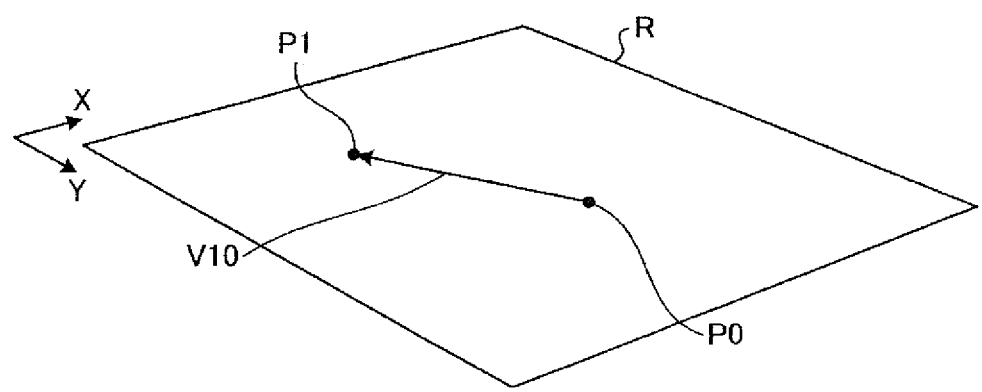
FIG. 5 is an explanatory view of a movement vector according to the embodiment.

The movement vector calculating unit 200 maps the associated feature points, for example, on a predetermined coordinate plane R. FIG. 5 shows feature points P0 and P1 associated with each other. Although the feature points P0 and P1 represent the same feature point, since the acquisition times of images including the feature points P0 and P1 are different, the positions of the feature points P0 and P1 in those images are different. Also, the feature point P1 is a feature point extracted from an overhead image G21 acquired at a predetermined time t1, and the feature point P0 is a feature point extracted from an overhead image G20 acquired at a time t0 when an overhead image generating process was performed immediately before the predetermined time t1. The movement vector calculating unit 200 calculates a vector which starts from the feature point P0 and ends at the feature point P1, as a movement vector (an optical flow) V10 at the time t1. FIG. 5 is an explanatory view of the movement vector V10.

[2.2.2.3. Movement Amount Estimating Unit 300]

The movement amount estimating unit 300 is an estimating unit configured to estimate the movement amount D of the vehicle C at each time set at intervals of the predetermined time T on the basis of the feature points P extracted by the feature point extracting unit 120 of the extracting unit 100. The predetermined time T is a time which is required for the vehicle state determining device 10 to perform a determining process, and corresponds to, for example, the period of one frame of acquired images G1 (the reciprocal of the frame rate). The movement amount estimating unit 300 calculates the magnitude of the movement vector V calculated by the movement vector calculating unit 200, thereby estimating the movement amount D. The movement amount estimating unit 300 outputs the estimated movement amount D to the change amount detecting unit 400 and the determining unit 500.

Although the case where the movement amount estimating unit 300 estimates the movement amount D from the movement vector V has been described, the present invention is not limited thereto. For example, the movement amount estimating unit 300 may be configured to estimate the movement amount D directly from the feature points P extracted by the feature point extracting unit 120 of the extracting unit 100. In this case, the movement amount estimating unit 300 estimates, for example, the distance between the feature points P0 and P1 mapped on the coordinate plane R as shown in FIG. 5, as the movement amount D.

As described above, the movement amount estimating unit 300 estimates the movement amount D of the vehicle C at each time set at intervals of the predetermined time T. Therefore, it can be said that the movement amount estimating unit 300 estimates the velocity of the vehicle C.

[2.2.2.4. Change Amount Detecting Unit 400]

The change amount detecting unit 400 detects the change amount A of the movement amount D on the basis of the movement amount D estimated at intervals of the predetermined time T by the movement amount estimating unit 300. The change amount detecting unit 400 detects, for example, the difference between the movement amount D1 of the vehicle C estimated at the time t1 and the movement amount D0 of the vehicle C estimated at the time t0 immediately before the time t1, as the change amount A1 of the movement amount D1 at the time t1. The change amount detecting unit 400 outputs the detected change amount A to the determining unit 500.

As described above, the change amount detecting unit 400 detects the change amount A of the movement amount D of the vehicle C. Therefore, it can be said that the change amount detecting unit 400 estimates the acceleration of the vehicle C. As described above, the change amount detecting unit 400 detects the change amount A by calculating the differential value of the movement amount D estimated at intervals of the predetermined time T.

[2.2.2.5. Determining Unit 500]

The determining unit 500 performs determination on movement of the vehicle C, that is, the traveling state, on the basis of the movement amount D estimated by the movement amount estimating unit 300 and the change amount A detected by the change amount detecting unit 400. The determining unit 500 includes, for example, a counter unit 510, an initializing unit 520, and a movement determining unit 530.

In a case where the movement amount D is equal to or greater than the first threshold TH1, and the change amount A is less than the second threshold TH2, the counter unit 510 adds a first value E1 to a counter value CV; whereas, in a case where the movement amount D is less than the first threshold TH1, or the change amount A is equal to or greater than the second threshold TH2, the counter unit subtracts a second value E2 from the counter value CV.

Figure 6:
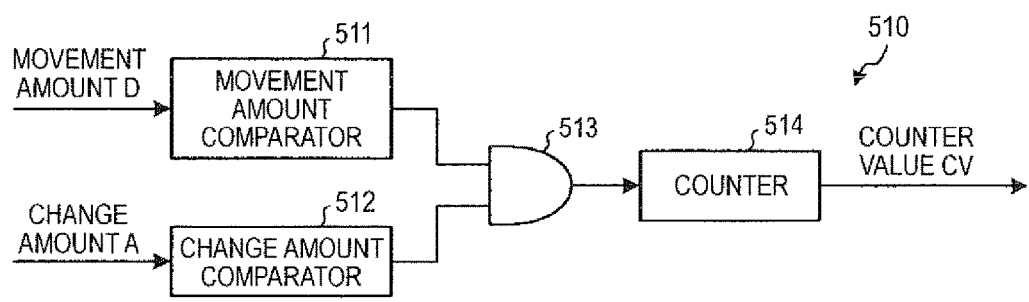
FIG. 6 is a view illustrating a configuration example of a counter unit according to the embodiment.
Figure 7:
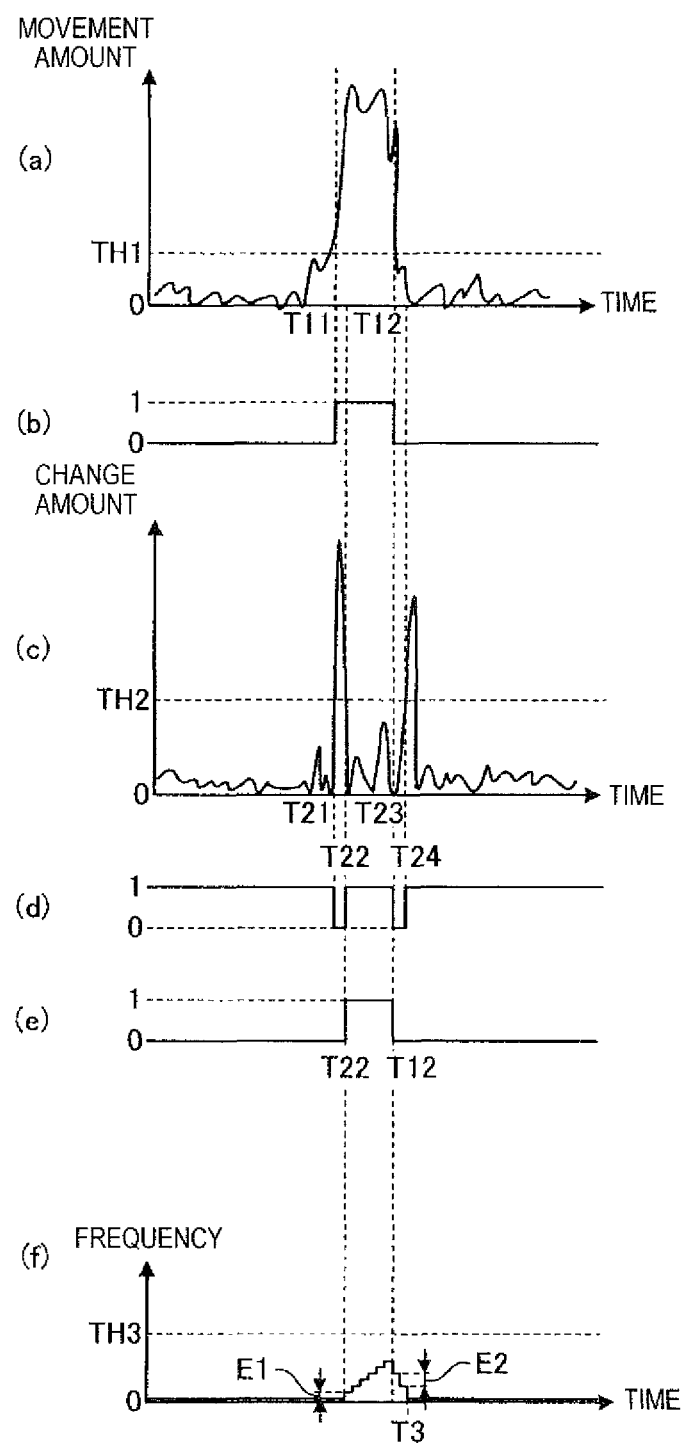
FIG. 7 is a view for explaining processing which is performed by the counter unit according to the embodiment.

With reference to FIGS. 6 and 7, details of the counter unit 510 will be described. FIG. 6 is a view illustrating a configuration example of the counter unit 510. FIG. 7 is a view for explaining processing which is performed by the counter unit 510. As shown in FIG. 6, the counter unit 510 includes a movement amount comparator 511, a change amount comparator 512, an AND operator 513, and a counter 514.

The movement amount comparator 511 compares the movement amount D estimated at each time set at intervals of the predetermined time T by the movement determining unit 530, with the first threshold TH1, and outputs the comparison result to the AND operator 513. For example, in a case where the movement amount D is equal to or greater than the first threshold TH1, the movement amount comparator 511 outputs a signal representing "1" to the AND operator 513; whereas in a case where the movement amount D is less than the first threshold TH1, the movement amount comparator outputs an output signal representing "0" to the AND operator.

In a case where the movement amount D as shown in (a) of FIG. 7 is input to the movement amount comparator 511, as shown in (b) of FIG. 7, before a time T11, the movement amount comparator 511 outputs an output signal representing "0" to the AND operator 513, and between the time T11 and a time T12, the movement amount comparator outputs an output signal representing "1" to the AND operator, and after the time T12 outputs an output signal representing "0" to the AND operator. In FIG. 7, (a) is a graph illustrating variation of the movement amount D with time, and (b) is a view illustrating the output signal of the movement amount comparator 511.

The change amount comparator 512 compares the change amount A estimated at each time set at intervals of the predetermined time T by the change amount detecting unit 400, with the second threshold TH2, and outputs the comparison result to the AND operator 513. For example, in a case where the change amount A is less than the second threshold TH2, the change amount comparator 512 outputs a signal representing "1" to the AND operator 513; whereas in a case where the change amount is equal to or greater than the second threshold TH2, the change amount comparator outputs an output signal representing "0" to the AND operator.

In a case where the change amount A as shown in (c) of FIG. 7 is input to the change amount comparator 512, as shown in (d) of FIG. 7, between a time T21 and a time T22 and between a time T23 and a time T24, the change amount comparator 512 outputs an output signal representing "0" to the AND operator 513, and at the other times, the change amount comparator outputs an output signal representing "1" to the AND operator. In FIG. 7, (c) is a graph illustrating variation of the change amount A with time, and (d) is a view illustrating the output signal of the change amount comparator 512.

The AND operator 513 performs AND operation on the output signal of the movement amount comparator 511 and the output signal of the change amount comparator 512, and outputs an operation signal representing the operation result, to the counter 514. For example, if the signal shown in (b) of FIG. 7 and the signal shown in (d) of FIG. 7 are input to the AND operator 513, between the time T22 and the time T12, the AND operator 513 outputs an operation signal representing "1" to the counter 514, and at the other times, the AND operator outputs an operation signal representing "0" to the counter. In FIG. 7, (e) is a view illustrating the operation signal of the AND operator 513.

In a case where the operation signal represents "1", the counter 514 adds the first value E1 to the counter value CV; whereas in a case where the operation signal represents "0", the counter subtracts the second value E2 larger than the first value E1 (E1<E2), from the counter value CV. The counter 514 outputs the counter value CV to the movement determining unit 530.

In the present embodiment, since the counter 514 subtracts the second value E2 larger than the first value E1 from the counter value CV, in a case where disturbance occurs at predetermined intervals, for example, a case where the hazard lamps are flashing, or a case where a moving object repeatedly moves within the imaging range of the imaging device 2, it is possible to suppress the vehicle state determining device 10 from erroneously determining the traveling state of the vehicle C.

For example, in a case where the operation signal of the AND operator 513 shown in (e) of FIG. 7 is input, as shown in (f) of FIG. 7, between the time T22 and the time T12, the counter 514 adds the first value E1 to the counter value CV, and after the time T12, the counter subtracts the second value E2 from the counter value CV. Also, if a notification representing a request 10 to for initializing the counter value CV is received from the initializing unit 520, for example, at a time T3, the counter 514 initializes the counter value CV. At this time, for example, the counter initializes the counter value CV to zero. In FIG. 7, (f) is a view illustrating the counter value CV which is output by the counter 514.

As show in (f) of FIG. 7, the movement determining unit 530 compares the counter value CV with a third threshold TH3. In a case where the counter value CV is equal to or greater than the third threshold TH3, the movement determining unit determines that the movement amount D has been maintained in a range equal to or greater than the first threshold TH1 and the change amount A has been maintained in a range less than the second threshold TH2, and determines that the vehicle C is in a movement state. Meanwhile, in a case where the counter value CV is less than the third threshold TH3, the movement determining unit 530 determines that the movement amount D has not been maintained in the range equal to or greater than the first threshold TH1, or the change amount A has not been maintained in the range less than the second threshold TH2, and determines that the vehicle C is in a stop state. The movement determining unit 530 outputs the determination result to the image generating unit 40.

In a case where the counter value has been maintained in a range equal to or greater than a fourth threshold TH4 by consecutive subtraction processes of the counter unit 510, the initializing unit 520 initializes the counter value CV. Specifically, for example, on the basis of the counter value CV, the initializing unit 520 determines whether the counter 514 has performed an addition process or a subtraction process.

For example, on the basis of the difference between a counter value CV1 at the time t1 and a counter value CV0 at the time t0, the initializing unit 520 determines whether the counter 514 has performed an addition process of adding the first value E1 to the counter value CV, or a subtraction process of subtracting the second value E2 from the counter value CV. In a case where the counter value has been maintained in the range equal to or greater than the fourth threshold TH4 due to consecutive subtraction processes, the initializing unit 520 outputs a notification representing a request for initializing the counter value CV, to the counter 514.

In the present embodiment, since the initializing unit 520 initializes the counter value CV under a predetermined condition, it is possible to reduce a possibility that the counter value CV will be equal to or greater than the third threshold TH3 in a case where disturbance occurs many times at short intervals, for example, a case where the hazard lamps are flashing, or a case where a moving object repeatedly moves within the imaging range of the imaging device 2. Therefore, it is possible to suppress the vehicle state determining device 10 from erroneously determining the traveling state of the vehicle C.

In the above description, if a state where the movement amount D is equal to or greater than the first threshold TH1 and the change amount A is less than the second threshold TH2 (hereinafter, referred to as the predetermined state) appears, the determining unit 500 detects whether the predetermined state has continued, on the basis of the counter value CV. If the predetermined state has continued, the determining unit determines that the vehicle C is in a traveling state. However, the present invention is not limited thereto. For example, the determining unit may be configured to perform traveling-state determination on the basis of whether the movement amount and the change amount are in the predetermined state. In other words, in a case where the movement amount D is equal to or greater than the first threshold TH1 and the change amount A is less than the second threshold TH2, the determining unit 500 may determine the vehicle C is in a movement state; whereas in a case where the movement amount D is less than the first threshold TH1 or the change amount A is equal to or greater than the second threshold TH2, the determining unit 500 may determine that the vehicle C is in a stop state, and the determining unit may perform such determination at intervals of a predetermined time.

Alternatively, the determining unit may be configured to perform movement determination on the basis of the appearance intervals or appearance frequency of the change amount in the range less than the second threshold TH2 in the appearance state.

For example, even though the change amount A changes from an amount equal to or greater than the second threshold TH2 to an amount less than the second threshold TH2 at a time t4, if a predetermined period T2 has elapsed from a previous time t3 when the change amount A was less than the second threshold TH2 (T2<(t4−t3)), the determining unit 500 may determine that the vehicle C is in a stop state, regardless of the value of the movement amount D. In other words, the determining unit 500 may be configured to determine that the predetermined period T2 after the change amount A becomes equal to or greater than the second threshold TH2 is an unstable section, and not to perform determination on movement of the vehicle C in such an unstable section.

Alternatively, the determining unit 500 may be configured to determine that a predetermined period T3 after the change amount A becomes less than the second threshold TH2 is an unstable section, and not to perform determination on movement of the vehicle C in such an unstable section. The predetermined period 12 or T3 may be a fixed period, or may be a variable period which can be changed, for example, according to the appearance frequency of the change amount A in the range less than the second threshold TH2.

Also, even though the change amount A changes from an amount equal to or greater than the second threshold TH2 to an amount less than the second threshold TH2 at a time t4, if the frequency (appearance frequency) of the change amount A in the range less than the second threshold TH2 is less than a predetermined value, the determining unit 500 determines that the vehicle C is in a stop state, regardless of the value of the movement amount D. In other words, the determining unit 500 determines that a period when the frequency of the change amount A in the range less than the second threshold TH2 is less than the predetermined value is an unstable section, and does not perform determination on movement of the vehicle C in such an unstable section.

As described above, according to the appearance intervals or appearance frequency of the change amount A in the range less than the second threshold TH2, the determining unit performs determination on movement. Therefore, in a case where the change amount A of the movement amount D frequently changes like a case where the hazard lamps are flashing, the traveling state of the vehicle C does not frequently change, and it is possible to reduce erroneous determination on the traveling state of the vehicle C. Also, even in a case of drawing an estimated guide line L12 on the basis of the traveling state, frequent switching between the display state and non-display state of the estimated guide line L12 is difficult.

In the above description, the determining unit 500 performs determination on movement, on the basis of whether the movement amount D has been maintained in the range equal to or greater than the first threshold TH1 and the change amount A has been maintained in the range less than the second threshold TH2, or not. However, the present invention is not limited thereto. For example, the determining unit 500 may be configured to perform movement determination on the basis of a time when the movement amount D is maintained in the range equal to or greater than the first threshold TH1 after the change amount A becomes less than the second threshold TH2. Alternatively, the determining unit may be configured to perform movement determination on the basis of a time when the change amount A is maintained in the range less than the second threshold TH2 after the movement amount D becomes equal to or greater than the first threshold TH1.

In the above description, the counter unit 510 adds the first value E1 to the counter value CV. However, the present invention is not limited thereto. For example, the counter unit 510 may be configured to add a value according to the movement amount D. For example, as the movement amount D increases, the counter unit adds a smaller value to the counter value CV. Specifically, for example, the counter unit compares the movement amount D with a plurality of thresholds, and adds an additional value according to the comparison result, to the counter value CV. Alternatively, for example, the counter unit 510 may be configured to add a value according to the change amount A. For example, as the change amount A increases, the counter unit may add a smaller value to the counter value CV.

For example, in a case where the vehicle C is driven in reverse like a case of parking the vehicle, the velocity (movement amount D) and acceleration (change amount A) of the vehicle C are relatively low. Therefore, a possibility that a case where the movement amount D and the change amount A are large is attributable to influence of a moving object other than the vehicle C or influence of flashing of the hazard lamps. For this reason, as the movement amount D and the change amount A increase, the counter unit adds a smaller value to the counter value CV. As a result, it is possible to reduce erroneous determination on the traveling state of the vehicle C.

Also, even in a case of subtracting a value from the counter value CV, similarly, the counter unit may subtract a value according to the movement amount D and the change amount A. In this case, as the movement amount D and the change amount A increase, the counter unit subtracts a larger value from the counter value CV. As a result, it is possible to reduce erroneous determination on the traveling state of the vehicle C.

[2.2.3. Estimating Unit 30]

The estimating unit 30 estimates the movement path of the vehicle C on the basis of the feature points P extracted by the extracting unit 100. The estimating unit 30 extracts the movement path of the vehicle C on the basis of the movement vector V calculated by the movement vector calculating unit 200.

The estimating unit 30 calculates the amount of turning of the vehicle C on the basis of the movement vector V calculated by the movement vector calculating unit 200. Here, the concept of the amount of turning of the vehicle C includes the direction of turning, the angle of turning, the amount of translation, and the like. The estimating unit 30 extracts a road movement vector, from the movement vector V calculated by the movement vector calculating unit 200, and calculates the amount of turning of the vehicle C on the basis of the extracted road movement vector. On the basis of the calculated turning amount, the estimating unit 30 estimates the movement path of the vehicle C. Then, the estimating unit 30 outputs the estimated movement path to the image generating unit 40.

In the above description, the display processing device 1 includes the estimating unit 30. However, the present invention is not limited thereto. For example, the vehicle state determining device 10 may be configured to include the estimating unit 30. Also, the estimating unit 30 may be configured to estimate the movement path using any other sensor such as a rudder angle sensor.

[2.2.4. Image Generating Unit 40]

On the basis of the determination result of the determining unit 500, the image generating unit 40 generates an image for assisting the driver in driving the vehicle C. The image generating unit 40 generates an estimated-path image including a fixed guide line L11 and an estimated guide line L12 of a display mode according to the traveling state of the vehicle C.

Figure 8A:
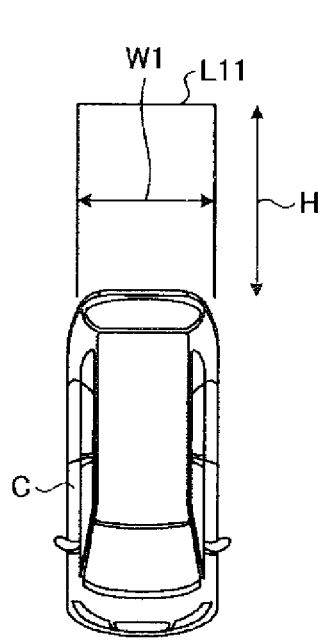
FIGS. 8A and 8B are views illustrating a fixed guide line and an estimated guide line according to the embodiment, respectively.
Figure 8B:
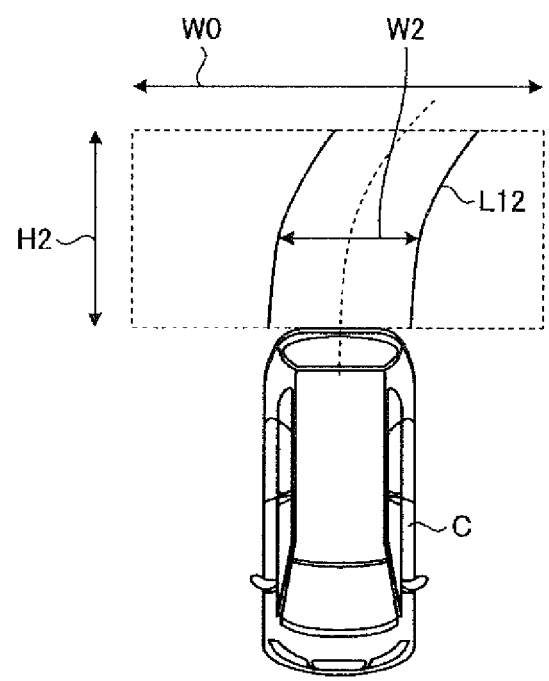

Now, the fixed guide line L11 and the estimated guide line L12 will be described with reference to FIGS. 8A and 8B. FIGS. 8A and 8B are views illustrating the fixed guide line L11 and the estimated guide line L12 as seen from a point above the vehicle C, respectively.

The fixed guide line L11 shown in FIG. 8A is a line which is drawn in a predetermined area, and is a predetermined frame line which is displayed regardless of the movement path and traveling state of the vehicle C. The fixed guide line L11 is a line having a width W1 almost equal to the width of the vehicle and surrounded by lines extending from the rear side of the vehicle C toward a direction away from the rear side of the vehicle C by a length H1 and a line connecting those lines. However, the fixed guide line L11 shown in FIG. 8A is an example, and the present invention is not limited thereto. For example, the fixed guide line L11 may include a line representing a distance from the rear side of the vehicle C.

The estimated guide line L12 shown in FIG. 8B is a guide line which is drawn at a position estimated as the movement path of the vehicle C. The estimated guide line is a line having a width W2 almost equal to the width of the vehicle and extending at a position estimated as the movement path from the rear portion of the vehicle C. The estimated guide line L12 is a portion of an arc (the estimated path) whose center is, for example, the turning center of the amount of turning calculated by the estimating unit 30, and is included in a rectangular drawing area having a width W0 and a length H2. As described above, the estimated guide line L12 is determined on the basis of the path estimated by the estimating unit 30.

In the present embodiment, the image generating unit 40 changes the length H2 of the above described drawing area in the front-rear direction of the vehicle C, within a predetermined range (H1≥H2≥0), according to the traveling state of the vehicle C, thereby changing the length of the estimated guide line L12 to be drawn in the corresponding range. The image generating unit 40 changes the length of the drawing area within the predetermined range (H1≥H2≥0), for example, by multiplying the length H2 with a length adjustment magnification.

Subsequently, according to the traveling state of the vehicle C, the image generating unit 40 determines one of modes A to D as a mode for drawing the estimated guide line L12, on the basis of the traveling state of the vehicle C, and generates an estimated-path image including the estimated guide line drawn in the drawing mode. FIG. 9 is a timing chart illustrating the corresponding relation of traveling states, the drawing modes, and length adjustment magnifications.

As shown in FIG. 9, in a case where the traveling state is "STOP" (the mode A), the image generating unit 40 sets 0.0 as the length adjustment magnification of the drawing area of the estimated guide line L12. In other words, the image generating unit 40 does not draw the estimated guide line L12 (see FIG. 10).

Thereafter, if the traveling state changes to "MOVEMENT" (the mode B), the image generating unit 40 changes the length adjustment magnification from 0.0 to 1.0. In other words, the image generating unit 40 draws while lengthening the estimated guide line L12 (see FIG. 12).

After the length adjustment magnification changes to 1.0, if the traveling state is "MOVEMENT" (the mode C), the image generating unit 40 maintains the length adjustment magnification at 1.0. In other words, the image generating unit 40 draws the estimated guide line L12 longest (see FIG. 11).

Thereafter, if the traveling state changes from "MOVEMENT" to "STOP" (the mode D), the image generating unit 40 changes the length adjustment magnification from 1.0 to 0.0. In other words, the image generating unit 40 draws while shortening the estimated guide line L12 (see FIG. 12). The reason is that since the traveling state has changed from "MOVEMENT" to "STOP", it is unnecessary to display the estimated guide line L12. Also, since the estimating unit 30 estimates the movement path of the vehicle C on the basis of the movement vector V as described above, if the traveling state changes to "STOP", the accuracy of estimation of the movement path of the vehicle C decreases. In other words, since the reliability of the estimated guide line L12 decreases, the length of the estimated guide line L12 having low reliability is reduced.

Also, in the modes B and D, the length of the estimated guide line L12 is changed at an arbitrary rate, and it is preferable that the rate of change in the mode D should be lower than the rate of change in the mode B. The reason is that it is preferable to make it possible to immediately check the estimated guide line L12 when the traveling state has changed from a stop state to a movement state, and in a case where the traveling state changes from a movement state to a stop state, if the length of the estimated guide line gradually decreases, a driver can easily grasp that the vehicle is transitioning to a stop state.

Thereafter, similarly, the image generating unit 40 draws the estimated guide line L12 on the basis of a drawing mode according to the traveling state.

Also, for example, in a case where the traveling state changes when the length adjustment magnification is changing to 0.0 in the mode D, whereby the mode B is selected, the length adjustment magnification changes from the corresponding magnification to 1.0 again. Like this, even in a case where the drawing mode is changed when the length adjustment magnification is changing, an estimated-path image is generated according to the changed mode.

Since the type and length of a guide line to be displayed depends on the traveling state of the vehicle C, a change in the traveling state, and the like as described above, it is possible to display an appropriate guide line according to the state.

[2.2.5. Display Control Unit 50]

In a case where the determining unit 500 determines that the vehicle C is in a movement state, the display control unit 50 controls the display device 3, such that the display device displays an estimated-path image representing the movement path estimated by the estimating unit 30, on the image G1. The display control unit 50 superimposes the estimated-path image generated by the image generating unit 40, on the image G1, thereby generating a display image G3. The display control unit 50 controls the display device 3 such that the display device displays the display image G3.

Figure 10:
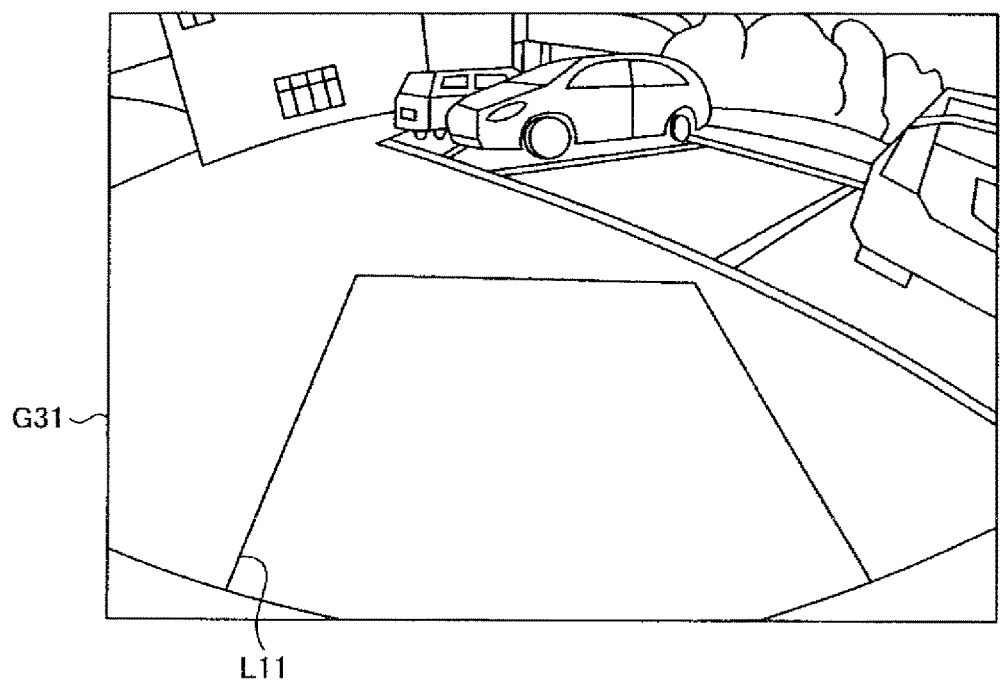
FIG. 10 is an image illustrating a display image according to the embodiment.
Figure 11:
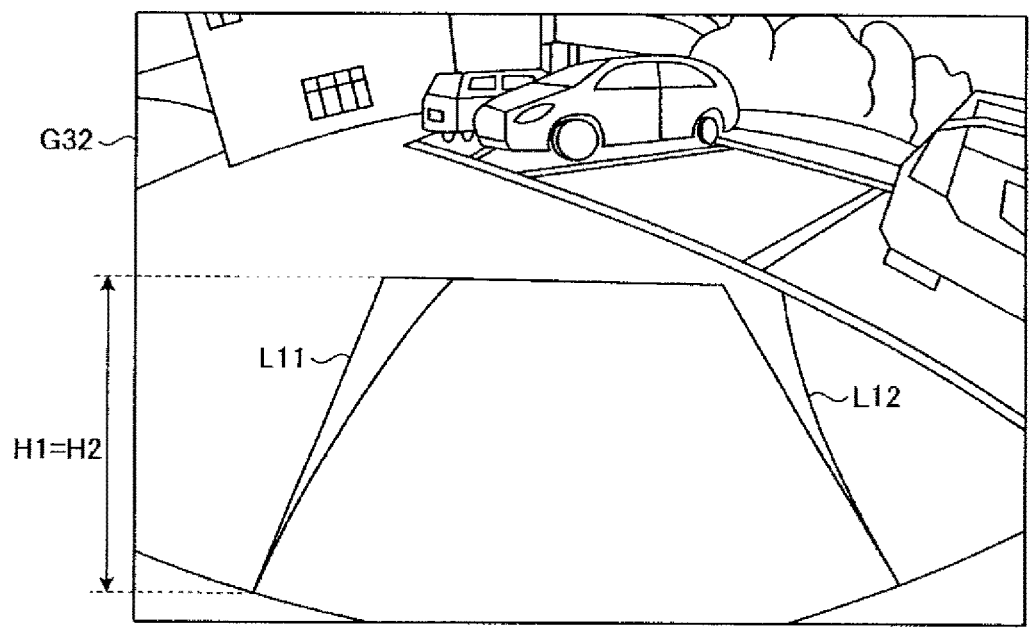
FIG. 11 is an image illustrating another display image according to the embodiment.
Figure 12:
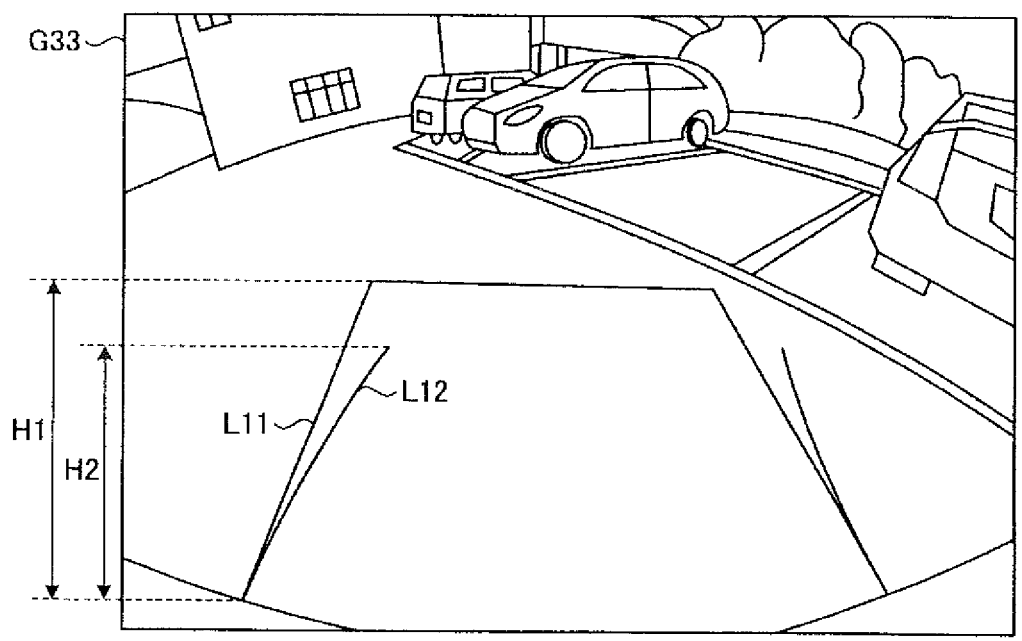
FIG. 12 is an image illustrating a further display image according to the embodiment.

With reference to FIGS. 10 to 12, an example of the display image G3 will be described. FIG. 10 shows a display image G31 in the drawing mode A. As shown in FIG. 10, in the drawing mode A, the display control unit 50 controls the display device 3 such that the display device displays the display image G31 obtained by superimposing the fixed guide line L on the image G1.

FIG. 11 shows a display image G32 in the drawing mode C. As shown in FIG. 11, in the drawing mode C, the display control unit 50 controls the display device 3 such that the display device displays the display image G32 obtained by superimposing the fixed guide line L11 and the estimated guide line L12 whose length H2 is the maximum value H1 (H2=H1) on the image G1.

FIG. 12 shows a display image G33 in the drawing modes B and D. As shown in FIG. 12, in the drawing modes B and D, the display control unit 50 controls the display device 3 such that display device displays the display image G33 obtained by superimposing the fixed guide line L11 having the length H1 and the estimated guide line L12 whose length H2 changes, on the image G1.

[2.2.6. Storage Unit 60]

The storage unit 60 stores information necessary for the individual units of the vehicle state determining device 10 to perform processing, such as the first to fourth thresholds TH1 to TH4 and the counter value CV. Also, the storage unit 60 stores information necessary for the individual units of the display processing device 1 to perform processing.

The storage unit 60 is a semiconductor memory device such as a random access memory (RAM) or a flash memory, or a storage device such as a hard disk or an optical disk.

[2.3. Display Device 3]

The display device 3 of FIG. 2 includes a liquid crystal display (LCD), and displays the display image G3 generated by the display control unit 50. The display device 3 may be a touch panel type display, and be configured to have a function as an input unit for the display processing device 1.

[3. Image Display Process]

Figure 13:
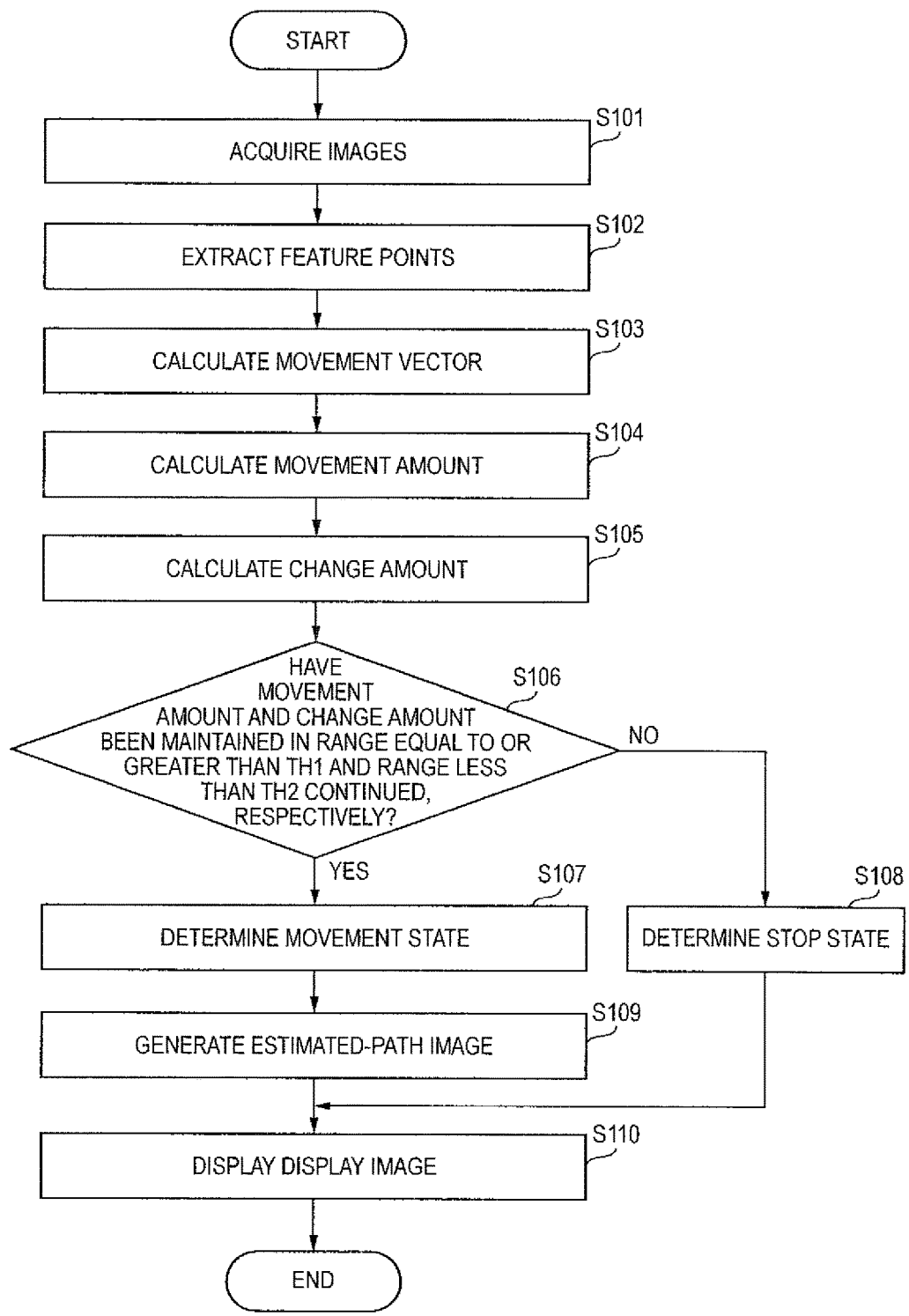
FIG. 13 is a flow chart illustrating an image display process according to the embodiment.

With reference to FIG. 13, an image display process which is performed by the display processing device 1 will be described. FIG. 13 is a flow chart illustrating the image display process according to the present embodiment. For example, if the gear of the vehicle C is changed to "R", and the vehicle C moves in reverse, the display processing device 1 performs the image display process. The image display process is repeatedly performed at intervals of the predetermined time T.

In STEP S101, the display processing device 1 acquires an image G1 from the imaging device 2. In STEP S102, the display processing device 1 extracts feature points P on the basis of the image G1. Subsequently, in STEP S103, the display processing device 1 calculates a movement vector V on the basis of the feature points P.

In STEP S104, the display processing device 1 calculates the movement amount D of the vehicle C on the basis of the movement vector V. In STEP S105, the display processing device 1 calculates the change amount A of the movement amount D on the basis of the movement amount D. In STEP S106, the display processing device 1 determines whether the movement amount D has been maintained in the range equal to or greater than the first threshold TH1 and the change amount A has been maintained in the range less than the second threshold TH2.

In a case where the movement amount D has been maintained in the range equal to or greater than the first threshold TH1 and the change amount A has been maintained in the range less than the second threshold TH2 ("Yes" in STEP S106), the display processing device 1 determines that the traveling state of the vehicle C is a movement state, in STEP S107, and generates an estimated-path image representing the movement path of the vehicle C, in STEP S109. Specifically, the display processing device 1 generates an estimated-path image including an estimated guide line L12 representing the movement path. Meanwhile, in a case where the movement amount D has not been maintained in the range equal to or greater than the first threshold TH1, or the change amount A has not been maintained in the range less than the second threshold TH2

("No" in STEP S106), the display processing device 1 determines that the traveling state of the vehicle C is a stop state, in STEP S108, and proceeds to STEP S110.

In STEP S110, the display processing device 1 controls the display device 3 such that the display device displays a display image G3. Specifically, in a case where an estimated-path image has been generated in STEP S109, the display processing device displays a display image G3 obtained by superimposing the estimated-path image on the image G1, on the display device 3. Meanwhile, in a case where any estimated-path image has not been generated, the display processing device 1 displays the image G1, as a display image G3, on the display device 3. However, in this case, an image obtained by superimposing the fixed guide line L1 on the image G may be used as a display image G3.

In the image display process shown in FIG. 13, in STEP S106, the display processing device determines whether the movement amount D has been maintained in the range equal to or greater than the first threshold TH1 and the change amount A has been maintained in the range less than the second threshold TH2. However, the present invention is not limited thereto. For example, the display processing device may separately determine whether the movement amount D has been maintained in the range equal to or greater than the first threshold TH1 and whether the change amount A has been maintained in the range less than the second threshold TH2, and determine the traveling state of the vehicle C on the basis of the determination results.

In the present embodiment, the display processing device 1 performs the image display process. However, for example, the vehicle state determining device 10 may perform some of the processes of STEPS S102 to S108.

In the present embodiment, the display processing device 1 performs the image display process if the gear state (traveling direction) of the vehicle C is switched from the drive position to the reverse position. However, the present invention is not limited thereto. For example, the display processing device may be configured to perform the image display process if a driver operates an assistance button (not shown) of the driving assistance system S.

As described above, the vehicle state determining device 10 according to the present embodiment determines the traveling state of the vehicle C on the basis of the movement amount D and the change amount A of the movement amount D, and thus can improve the accuracy of determination.

Also, the display processing device 1 displays a display image G3 on the basis of the determination of the vehicle state determining device 10. Therefore, in a case where the vehicle C is in a movement state, the display processing device can display an estimated guide line L12 representing an estimated path, thereby capable of more appropriately assisting the driver.

[4. Hardware Configuration]

Figure 14:
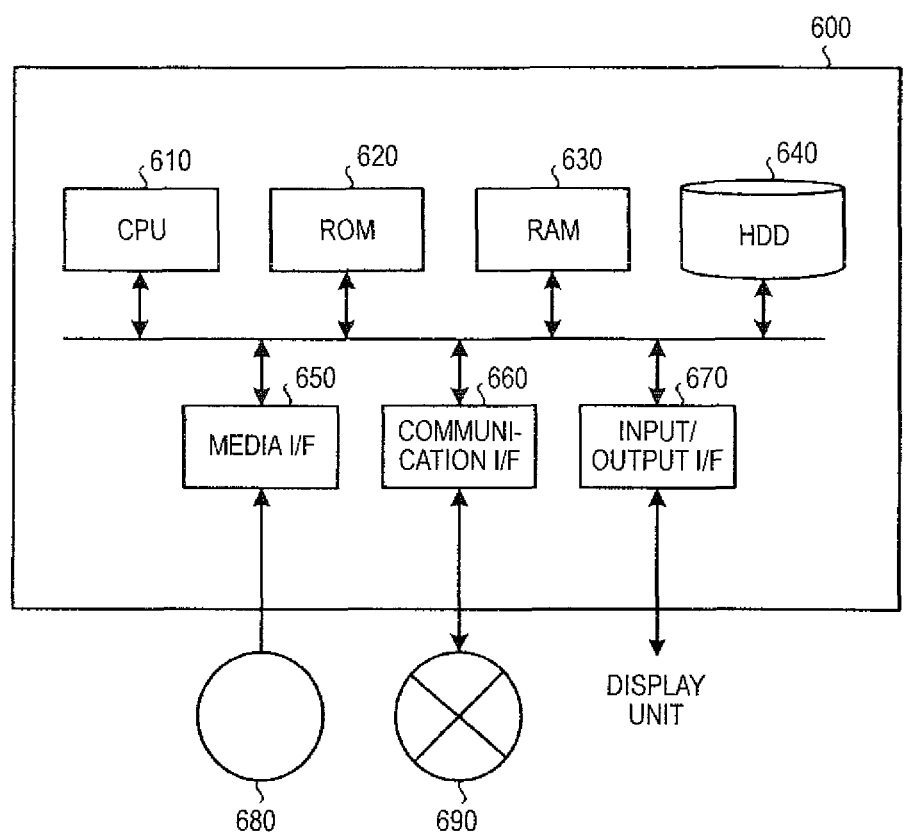
FIG. 14 is a hardware configuration diagram illustrating an example of a computer for implementing the function of a display processing device according to an embodiment.

The display processing device 1 according to the present embodiment can be implemented by a computer 600 having a configuration shown as an example in FIG. 14. FIG. 14 is a hardware configuration diagram illustrating an example of a computer for implementing the function of the display processing device 1.

The computer 600 includes a central processing unit (CPU) 610, a read only memory (ROM) 620, a random access memory (RAM) 630, and a hard disk drive (HDD) 640. Also, the computer 600 includes a media interface (I/F) 650, a communication interface (I/F) 660, and an input/output interface (I/F) 670.

Also, the computer 600 may include a solid state drive (SSD) for performing all or some of the functions of HDD 640. Also, the computer 600 may have an SSD in place of the HDD 640.

The CPU 610 operates on the basis of programs stored at least one of the ROM 620 and the HDD 640, thereby controlling the individual units. The ROM 620 is for storing a boot program which the CPU 610 executes during activation of the computer 600, programs depending on hardware of the computer 600, and so on. The HDD 640 is for storing programs which the CPU 610 can execute, data which are useable in those programs, and so on.

The media I/F 650 reads a program or data stored in a storage medium 680, and provides the program or data to the CPU 610 through the RAM 630. The CPU 610 loads the corresponding program from the storage medium 680 into the RAM 630 through the media I/F 650, and executes the loaded program. Also, the CPU 610 may use the corresponding data to execute a program. Examples of the storage medium 680 include a magneto-optical recording medium such as a digital versatile disc (DVD), an SD card, and a USB memory.

The computer 600 receives data from another device through a network 690, and transmits the received data to the CPU 610. Also, the computer transmits data generated by the CPU 610, to another device through the network 690. Further, the computer 600 receives programs from other devices through the network 690, and transmits the received programs to the CPU 610, and the CPU 610 executes the corresponding programs.

The CPU 610 controls the display device 3 such as a display, an output unit such as a speaker, and an input unit such as a keyboard, a mouse, and buttons, through the input/output I/F 670. The CPU 610 acquires data from the input unit through the input/output I/F 670. Also, if the CPU 610 generates data, it outputs the generated data to the display device 3 and the output unit through the input/output I/F 670.

For example, in a case where the computer 600 functions as the display processing device 1, the CPU 610 of the computer 600 executes programs loaded into the RAM 630, thereby implementing the functions of individual units such as the vehicle state determining device 10, the acquiring unit 20, the estimating unit 30, the image generating unit 40, and the display control unit 50.

For examples, the CPU 610 of the computer 600 reads those programs from the storage medium 680, and executes the read programs. However, as another example, the CPU may acquire those programs from another device through the network 690. Also, information which is stored in the storage unit 60 can be stored in the HDD 640.

[5. Modifications]

Although the embodiment of the present invention has been described above, the present invention is not limited to the above described embodiment, and can be modified in various forms. Hereinafter, these modifications will be described. All forms including the above described embodiment and the following embodiments to be described below can be appropriately combined.

In the embodiment, the case of calculating a movement vector V using overhead images G2 has been described. However, the present invention is not limited thereto. For example, a movement vector V on images G1 of the camera may be calculated from the images. In this case, the calculated movement vector V is projected onto a predetermined projection plane (such as a road surface), and the movement amount D is estimated. In this way, it is possible to calculate a movement vector V without generating overhead images G2 from images G1, and it is possible to reduce the processing load. Also, in a case of generating overhead images G2 from images G1, since the image quality deteriorates, the accuracy of calculation of a movement vector V may decrease. By omitting conversion into overhead images G2, it is possible to avoid deterioration in the corresponding calculation accuracy.

In the above described embodiment, if a transition to the drawing mode D occurs, the length adjustment magnification is reduced from 1.0, whereby the drawing area is reduced, whereby the estimated guide line L12 is gradually shortened. However, the present invention is not limited thereto. For example, it is possible to reduce the length adjustment magnification if a predetermined time elapses after a transition to the mode D. In some cases like a case of reversing the vehicle into a parking space, the driver may repeat movement and stop while driving the vehicle at low speed. In this case, it is unnecessary to frequently perform the process of shortening or lengthening the estimated guide line L12, and the driver can easily and visibly recognize the estimated guide line L12. Also, in the above described embodiment, after the determining unit 500 determines that the vehicle C is in a stop state, as time goes on, the length of the estimated guide line L12 is changed. However, the present invention is not limited thereto. For example, after the determining unit 500 determines that the vehicle C is in a stop state, as time goes on, the display mode of the estimated guide line L12 such as the concentration, the thickness, and the dotted-line interval may be changed.

As described above, the vehicle state determining device 10 according to the embodiment includes the extracting unit 100, the estimating unit (the movement amount estimating unit 300), and the determining unit 500. If the imaging device 2 mounted on the vehicle C acquires images G1, the extracting unit 100 extracts feature points P from the images G1. On the basis of the feature points P extracted by the extracting unit 100, the movement amount estimating unit 300 estimates the movement amount D of the vehicle C at each time set at intervals of the predetermined time T. On the basis of the movement amount D estimated by the movement amount estimating unit 300, and the change amount A of the movement amount D, the determining unit 500 performs determination on movement of the vehicle C.

Therefore, even in a case where the circumstances surrounding the vehicle C change, like a case where a vehicle C1 other than the vehicle C moves, it is possible to determine whether the vehicle C is moving, that is, the movement state of the vehicle C, with a high degree of accuracy.

If a state where the movement amount D is equal to or greater than the first threshold TH1 and the change amount A of the movement amount D is less than the second threshold TH2 appears, the determining unit 500 of the vehicle state determining device 10 according to the embodiment performs determination on movement of the vehicle C, on the basis of the appearance state.

As described above, on the basis of the appearance state obtained as the results of determination on the movement amount D and the change amount A using the thresholds, determination on movement of the vehicle C is performed. Therefore, it is possible to determine the movement state of the vehicle C with a high degree of accuracy.

The determining unit 500 of the vehicle state determining device 10 according to the embodiment includes the counter unit 510 and the movement determining unit 530. In a case where the movement amount D is equal to or greater than the threshold value TH1, and the change amount A is less than the second threshold TH2, the counter unit 510 adds the first value E1 to the counter value CV. In a case where the counter value CV is equal to or greater than the third threshold TH3, the movement determining unit determines that the vehicle C is in a movement state; whereas in a case where the counter value CV is less than the third threshold TH3, the movement determining unit determines that the vehicle C is in a stop state.

Therefore, on the basis of whether the appearance state determined by comparing the movement amount D and the change amount A with the thresholds has continued, it is possible to perform determination on movement of the vehicle C, and it is possible to determine the movement state of the vehicle C with a high degree of accuracy.

In a case where the movement amount D is less than the threshold value TH1, or the change amount A is equal to or greater than the second threshold TH2, the counter unit 510 of the vehicle state determining device 10 according to the embodiment subtracts the second value E2 from the counter value CV.

Therefore, for example, even though the state where the movement amount D is equal to or greater than the first threshold TH1 and the change amount A is less than the second threshold TH2 occurs intermittently, it is possible to determine the movement state of the vehicle C with a high degree of accuracy.

The determining unit 500 of the vehicle state determining device 10 according to the embodiment further includes the initializing unit 520 configured to initialize the counter value CV if the counter value has been maintained in the range equal to or greater than the fourth threshold TH4 due to consecutive subtraction processes of the counter unit 510.

Therefore, for example, even though the state where the movement amount D is equal to or greater than the first threshold TH1 and the change amount A is less than the second threshold TH2 occurs intermittently, it is possible to reduce erroneous determination on the traveling state of the vehicle C, and it is possible to determine the movement state of the vehicle C with a high degree of accuracy.

The display processing device 1 according to the embodiment includes the vehicle state determining device 10, the estimating unit 30, and the display control unit 50. The estimating unit 30 estimates the movement path of the vehicle C. In a case where the determining unit 500 determines that the vehicle C is in a movement state, the display control unit 50 controls the display device 3 such that the display device displays an estimated guide line L12 (an example of an estimated-path image) representing the movement path estimated by the estimating unit 30, on an image G1.

As described above, it is possible to generate an image according to a movement state by superimposing an estimated guide line L12 according to the movement state of the vehicle C determined with a high degree of accuracy by the vehicle state determining device 10, on the image G1, and display the corresponding image on the display device 3. Therefore, it is possible to present an appropriate image according to a movement state, to the driver.

The display processing device 1 according to the embodiment further includes the image generating unit 40. In a case where the determining unit 500 determines that the vehicle C is in a stop state, after the determining unit 500 determines that the vehicle C is in the stop state, as time goes on, the image generating unit generates an estimated-path image representing the movement path in a display mode according to the elapsed time.

Therefore, it is possible to present the estimated path such that the driver can easily grasp that the vehicle is transitioning to a stop state. Also, even in a case where the vehicle C alternately and repeatedly moves and stops, frequent switching between the display state and non-display state of the movement path is difficult, and it is possible to present the movement path without troubling the driver.

The vehicle state determining method according to the embodiment includes the extracting process, the estimating process, and the determining process. In the extracting process, the extracting unit 100 extracts feature points P from images G1 acquired by the imaging device 2 mounted on the vehicle C. In the estimating process, on the basis of the feature points P extracted by the extracting unit 100, the movement amount estimating unit 300 estimates the movement amount D of the vehicle C at each time set at intervals of the predetermined time T. In the determining process, on the basis of the movement amount D estimated by the movement amount estimating unit 300, and the change amount A of the movement amount D, the determining unit 500 performs determination on movement of the vehicle C.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle state determining device comprising a memory installed in the vehicle state determining device and a processor configured to execute the following steps:
   extracting, with the processor, feature points from images acquired by an imaging device mounted on a vehicle, the imaging device including an image sensor;
   storing the feature points in the memory;
   estimating, with the processor, a movement amount of the vehicle at intervals of a predetermined time, by calculating, with the processor, a movement vector of the feature points;
   detecting, with the processor, a change amount of the movement amount by calculating, with the processor, a difference between a first interval of the predetermined time and a second subsequent interval of the predetermined time;
   determining, with the processor, a movement of the vehicle based on the movement amount and the change amount of the movement amount, the movement of the vehicle is determined when the movement amount is equal to or greater than a first threshold and the change amount is less than a second threshold;
   adding a first value to a counter value when the movement amount of the vehicle is equal to or greater than the first threshold and the change amount is less than the second threshold; and
   determining that the vehicle is in a movement state, when the counter value is equal to or greater than a third threshold, and determining that the vehicle is in a stop state, when the counter value is less than the third threshold.

2. The vehicle state determining device according to claim 1, wherein in a case when the movement amount of the vehicle is less than the first threshold or the change amount is equal to or less than the second threshold, the processor subtracts a second value from the counter value.

3. The vehicle state determining device according to claim 2, wherein in a case when the movement amount of the vehicle is less than the first threshold or the change amount is equal to or less than the second threshold, the processor subtracts the second value, which is larger than the first value, from the counter value.

4. The vehicle state determining device according to claim 2, wherein the processor further executes the step of initializing the counter value, when the counter value has been maintained at a value equal to or greater than a fourth threshold by consecutive subtracting.

5. A display processing device comprising:
   the vehicle state determining device according to claim 1, the processor being configured to further execute the following steps:
   predicting a movement path of the vehicle; and
   controlling a display device such that the display device displays an estimated-path image representing the movement path on the acquired images, when determining that the vehicle is in the movement state.

6. The display processing device according to claim 5, the processor configured to further execute the following step:
   generating the estimated-path image representing the movement path in a mode according to a time which elapses after determining that the vehicle is in the stop state, when determining that the vehicle is in the stop state.

7. A method, performed by a vehicle state determining device including a memory installed in the vehicle state determining device and a processor, the method performing the following steps:
   extracting, with the processor, feature points from images acquired by an imaging device mounted on a vehicle, the image device including an image sensor;
   storing the feature points in the memory;
   estimating, with the processor, a movement amount of the vehicle at intervals of a predetermined time, by calculating, with the processor, a movement vector of the feature points;
   detecting, with the processor, a change amount of the movement amount by calculating, with the processor, a difference between a first interval of the predetermined time and a second subsequent interval of the predetermined time; and
   determining, with the processor, a movement of the vehicle based on the movement amount and the change amount of the movement amount, the movement of the vehicle is determined when the movement amount is equal to or greater than a first threshold and the change amount is less than a second threshold;
   adding a first value to a counter value when the movement amount of the vehicle is equal to or greater than the first threshold and the change amount is less than the second threshold; and
   determining that the vehicle is in a movement state, when the counter value is equal to or greater than a third threshold, and determining that the vehicle is in a stop state, when the counter value is less than the third threshold.

* * * * *